(No Model.)

L. P. DUCOURNAU.
Motor.

No. 231,774. Patented Aug. 31, 1880.

WITNESSES:
Francis McArdle,
C. Sedgwick.

INVENTOR:
L. P. Ducournau,
BY Munn & Co.
ATTORNEYS.

UNITED STATES PATENT OFFICE.

LÉONCE P. DUCOURNAU, OF NEW ORLEANS, LOUISIANA.

MOTOR.

SPECIFICATION forming part of Letters Patent No. 231,774, dated August 31, 1880.

Application filed June 18, 1880. (No model.)

*To all whom it may concern:*

Be it known that I, LÉONCE P. DUCOURNAU, of New Orleans, in the parish of Orleans and State of Louisiana, have invented a new and useful Improvement in Motors, of which the following is a specification.

My invention relates to a motor for driving sewing-machines and other small machinery by either weight or spring power.

The invention consists in a novel arrangement and combination of springs, gearing, and a fly-wheel, and devices connected therewith, as hereinafter particularly described.

Figure 1:
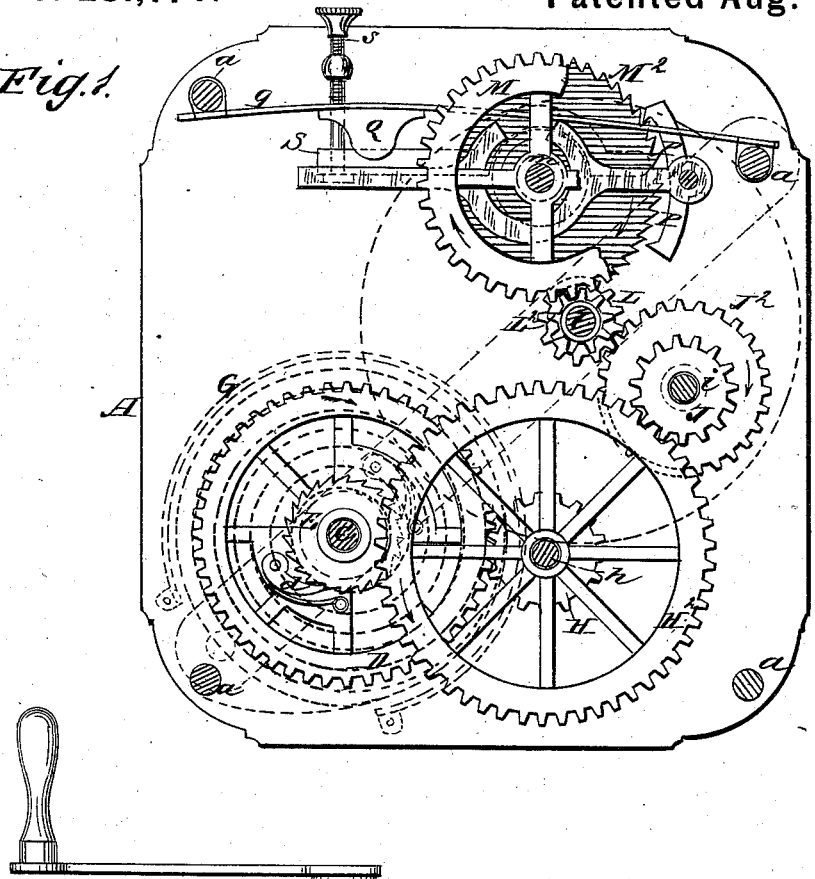
Figure 2:
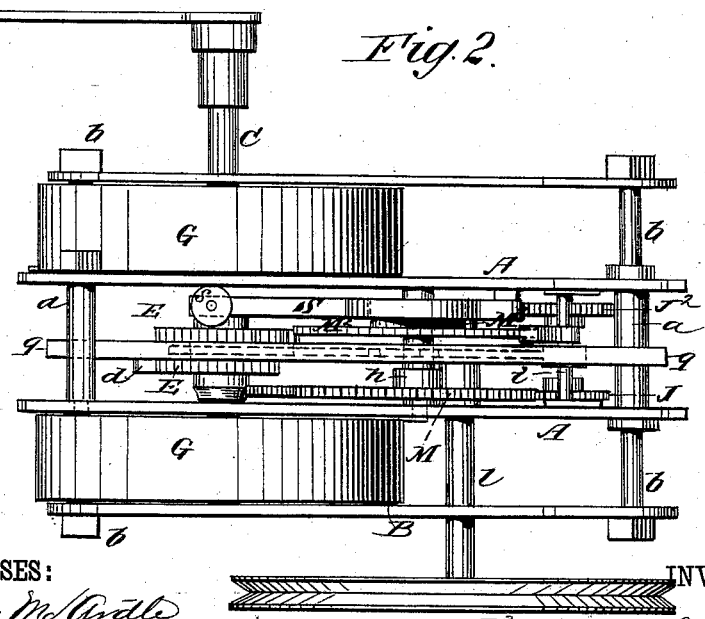

In the accompanying drawings, Figure 1 is a side view of an apparatus embodying my improvements. Fig. 2 is a top view of the same.

Similar letters of reference indicate corresponding parts.

A A represent two plates connected by posts $a$. Between the two plates the train of gearing is arranged to work, the shafts or arbors having their bearings in said plates.

Outside of the plates A are two bars, B B, connected to said plates by posts $b$. These bars furnish the bearings for the ends of a shaft or arbor, C, which passes midway of its length through a gear-wheel, D, to which are attached two pawls, $d$, engaging with ratchet-wheels E fixed to said shaft or arbor C.

On the shaft or arbor C, outside of the plates A, are two coiled springs, G G, arranged in the manner usual in clock mechanism.

The gear-wheel D meshes into a pinion, H, on a shaft or arbor, $h$, which also carries a gear-wheel, $H^2$. The gear-wheel $H^2$ meshes into a pinion, J, on a shaft, $i$, which also carries a gear-wheel, $J^2$. The gear-wheel $J^2$ meshes into a pinion, L, on a shaft, $l$, which also carries another pinion, $L^2$. The pinion $L^2$ meshes into a gear-wheel, M, on a shaft, $m$, which also carries an escape-wheel, $M^2$, and a friction-wheel, $M^3$.

The escape-wheel $M^2$ has arranged to engage with it an anchor, P, the stem of which is arranged to engage with a rubber cushion, Q, carried by an elastic bar, $q$, attached to two of the posts $a$.

The friction-wheel $M^3$ has arranged to engage with it a brake consisting of an elastic bar, S, provided with a thumb-screw, $s$, for regulating its tension.

The shaft $l$ carries a grooved fly-wheel, $L^3$, from which a band passes to the main shaft of the machine to be driven.

The springs G being wound up, they impart motion to the apparatus in the act of unwinding.

The motion of the train of gearing is rendered regular and uniform by means of the anchor P, which acts as a pendulum, and the velocity is regulated by means of the brake S and screw $s$.

Having thus described my invention, I claim as new and desire to secure by Letters Patent—

1. The combination of the two springs G G, the gearing D H $H^2$, J $J^2$, L $L^2$, and M, the shafts carrying said gearing, the escape-wheel $M^2$, anchor P, rubber cushion Q, and elastic bar $q$, all arranged as herein shown and described.

2. The brake consisting of the bar S and screw $s$, in combination with the friction-wheel $M^3$ and the train of mechanism herein described, for the purpose specified.

LÉONCE PIERRE DUCOURNAU.

Witnesses:
L. I. COURTAULT,
P. McPRIDE.